United States Patent
Lin et al.

(10) Patent No.: US 6,697,680 B2
(45) Date of Patent: Feb. 24, 2004

(54) METHOD FOR COMPENSATING SIGNALS FROM AN ABSOLUTE ANGULAR POSITION SENSOR ASSEMBLY

(75) Inventors: Yingjie Lin, El Paso, TX (US); Esau Aguinaga, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 289 days.

(21) Appl. No.: 09/924,875

(22) Filed: Aug. 8, 2001

(65) Prior Publication Data

US 2003/0033033 A1 Feb. 13, 2003

(51) Int. Cl.[7] .............................................. G01C 19/00
(52) U.S. Cl. ........................ 700/13; 702/151; 701/41; 701/42; 700/54; 700/69; 700/71
(58) Field of Search .............................. 701/41, 42, 43; 33/1 PT, 286; 702/151; 700/12, 13, 302, 54, 69, 71

(56) References Cited

U.S. PATENT DOCUMENTS

| | | | | | |
|---|---|---|---|---|---|
| H000104 | H | * | 8/1986 | Hung et al. ................. | 341/115 |
| 4,742,332 | A | * | 5/1988 | Schroeder et al. ............ | 341/15 |
| 4,797,827 | A | * | 1/1989 | Cockerham ................. | 701/101 |
| 5,032,998 | A | * | 7/1991 | Filleau ........................ | 701/41 |
| 5,041,979 | A | * | 8/1991 | Hirka et al. ................. | 701/102 |
| 5,128,883 | A | * | 7/1992 | Neglia et al. ................ | 700/302 |
| 5,608,394 | A | * | 3/1997 | Hirabayashi ................. | 341/11 |
| 5,817,951 | A | * | 10/1998 | Cook et al. ............ | 73/862.041 |
| 5,930,905 | A | * | 8/1999 | Zabler et al. ................ | 33/1 PT |
| 6,058,358 | A | * | 5/2000 | Streichert .................... | 702/151 |
| 6,158,132 | A | * | 12/2000 | Kofink et al. ................ | 33/1 PT |
| 6,298,565 | B1 | * | 10/2001 | Weber et al. ................. | 33/1 PT |
| 6,481,272 | B1 | * | 11/2002 | Kieselbach ................. | 73/118.1 |
| 6,519,549 | B1 | * | 2/2003 | Lin et al. .................... | 702/151 |
| 6,539,329 | B2 | * | 3/2003 | Kato et al. .................. | 702/151 |
| 6,584,428 | B1 | * | 6/2003 | Irle et al. .................... | 702/151 |
| 2002/0111763 | A1 | * | 8/2002 | Koga .......................... | 702/151 |

* cited by examiner

Primary Examiner—Ramesh Patel
Assistant Examiner—Aaron C Perez-Daple
(74) Attorney, Agent, or Firm—Jimmy L. Funke

(57) ABSTRACT

A method for compensating signals from an absolute angular position sensor assembly is used in conjunction with an absolute angular position sensor assembly having an input gear coupled to a rotating shaft. The input gear is meshed with an output gear that rotates as the input gear and the shaft rotate. The sensor assembly includes an input gear sensor and an output gear sensor placed in proximity to the input gear and output gear, respectively. The gears are configured so as to be sensed by the sensors. The method includes determining an angular position compensation value that is used to adjust an absolute position of the input gear, which in turn is used to compute the absolute position of the rotating shaft. The angular position compensation value for the revolution N+1 is determined as $APCV_{N+1}=(APRS_N-AAPIG_N)/\alpha+APCV_N$, wherein $APCV_{N+1}$ is the angular position compensation value for the revolution N+1, $APRS_N$ is the angular position of the rotating shaft for the revolution N, $AAPIG_N$ is the adjusted angular position of the input gear for the revolution N, $\alpha$ is a compensation factor that is greater than one, and $APCV_N$ is angular position compensation value for the revolution N.

7 Claims, 1 Drawing Sheet

METHOD FOR COMPENSATING SIGNALS FROM AN ABSOLUTE ANGULAR POSITION SENSOR ASSEMBLY

TECHNICAL FIELD

The present invention relates to steering wheel absolute angular position sensors.

BACKGROUND OF THE INVENTION

In many applications, including motor vehicles, it can be important to know the absolute angular position of a rotating body. As but one example, when starting a motor vehicle, it may sometimes be necessary to know which steering revolution the steering wheel is in instantly at power up. Not only does this allow the driver to know which way the front wheels are directed before placing the vehicle into gear, but some computerized vehicle control systems might require knowing the steering position as well. For example, in an automated steering system, such as a steer-by-wire system, the control system must know the position of the steering wheel at all times in order to control the direction of the vehicle. Not only must these systems know the position of the steering wheel, they must know in which revolution the steering wheel is in at the time of measurement.

One such device includes a relatively large input gear installed on the steering shaft. The input gear is meshed with a relatively small output gear. A first magnetic field sensor and a second magnetic field sensor are placed near the input gear and the output gear, respectively. The gears are constructed so that as they rotate the angular position of the gears is sensed by the sensors. The ratio of the input gear to the output gear is chosen so that the gears are out of phase as they rotate through multiple revolutions. The signals from the sensors are used to determine the absolute position of the steering shaft. The second sensor provides a relatively accurate, high resolution signal representing the angular position of the output gear. This signal, used in conjunction with the out-of-phase angular position signal from the first sensor is used to determine which revolution the steering shaft is in when the signal is received from the second sensor. Thus, the absolute position of the steering shaft is known.

Theoretically, the angular position of the output gear is equal to the angular position of the input gear multiplied by the gear ratio. However, since the large input gear is installed on the steering shaft, the signal from the first sensor can be adversely effected by mechanical noise caused by slight lateral motion of the steering shaft, i.e., wobble. Moreover, the signal from the first sensor can be adversely effected by temperature changes, material magnetic hysteresis, and electrical noise. As recognized by the present invention, if the error in the signal is outside a predetermined range of tolerances, a microprocessor connected to the sensors will incorrectly determine which revolution the input gear is in when the signal is received. Thus, the microprocessor will incorrectly determine the absolute angular position of the steering shaft.

The present invention has recognized these prior art drawbacks, and has provided the below-disclosed solutions to one or more of the prior art deficiencies.

SUMMARY OF THE INVENTION

A method for determining an absolute position of a rotating shaft includes determining an angular position compensation value. Then, the absolute angular position of the rotating shaft is determined based on the angular position compensation value. Preferably, an adjusted angular position of an input gear that is connected to the rotating shaft is determined based on the angular position compensation value. The absolute angular position of the rotating shaft is then determined based on the adjusted angular position of the input gear.

In a preferred embodiment, the angular position compensation value is determined for a revolution N+1 by determining an angular position of the rotating shaft for a revolution N. Also, an angular position of the input gear for the revolution N is determined. Preferably, the angular position compensation value for the revolution N+1 is determined as $APCV_{N+1} = (APRS_N - AAPIG_N)/\alpha + APCV_N$, wherein $APCV_{N+1}$ is the angular position compensation value for the revolution N+1, $APRS_N$ is the angular position of the rotating shaft for the revolution N, $AAPIG_N$ is the adjusted angular position of the input gear for the revolution N, $\alpha$ is a compensation factor that is greater than one, and $APCV_N$ is angular position compensation value for the revolution N.

In a preferred embodiment, the method includes determining if the angular position compensation value is greater than a predetermined maximum threshold. If so, the angular position compensation value is established so that is equal to the predetermined maximum threshold. Moreover, it is determined if the angular position compensation value is less than a predetermined minimum threshold. If so, the angular position compensation value is established so that is equal to the predetermined minimum threshold.

In another aspect of the present invention, a vehicle control system includes an absolute angular position sensor assembly and a microprocessor connected to the sensor assembly. In this aspect, the microprocessor includes a program for adjusting a signal representative of an absolute position of a rotating shaft.

In still another aspect of the present invention, a method for determining an absolute position of a rotating shaft includes providing an input gear and providing an output gear. An angular position compensation value is determined. Moreover, an adjusted angular position of the input gear is determined based on the angular position compensation value. Then, the absolute position of the rotating shaft is determined based on the adjusted angular position of the input gear.

The present invention will now be described, by way of example, with reference to the accompanying drawings, in which:

DESCRIPTION OF AN EMBODIMENT OF THE INVENTION

Figure 1:
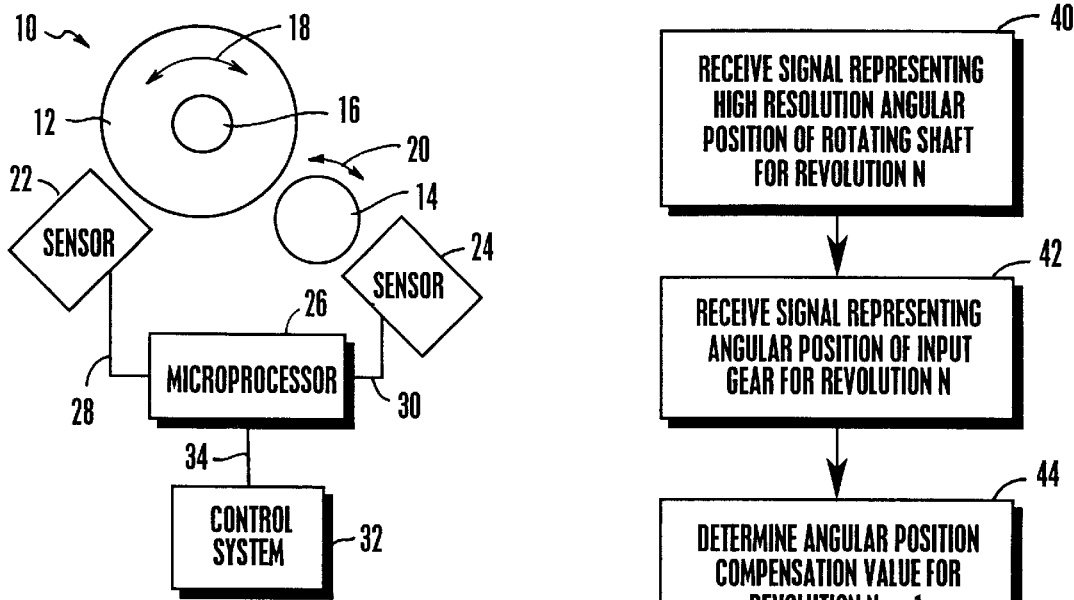
FIG. 1 is a block diagram of a vehicle control system in which an absolute angular position sensor assembly is incorporated.

Referring initially to FIG. 1, an absolute angular position sensor assembly is shown and generally designated 10. FIG. 1 shows that the absolute angular position sensor assembly 10 includes a relatively large input gear 12 meshed with a preferably smaller output gear 14. In a preferred embodiment, the input gear 12 is installed on or otherwise coupled to a rotating shaft 16, e.g., a steering wheel shaft or other rotating shaft, such that the input gear 12 and the shaft 16 rotate together at the same angular velocity in a direction as indicated by arc 18. The output gear 14 rotates about its axis in a direction indicated by arc 20. FIG. 1 also shows an input gear sensor 22 placed in proximity to the input gear 12 and an output gear sensor 24 placed in proximity to the output gear 14. As the gears 12, 14 rotate, the sensors 22, 24 sense the angular positions of the gears 12, 14. Preferably, the sensors 22, 24 are Hall sensors, MR sensors, or any other sensors well known in the art with similar capabilities, with the input gear 12 and the output gear 14 being constructed so as to be sensed by the sensors 22, 24.

As shown in FIG. 1, the first sensor 22 is connected to a microprocessor 26 by electrical line 28. The second sensor 24 is also connected to the microprocessor 26 by electrical line 30. FIG. 1 shows a control system 32, e.g., a steer-by-wire control system connected to the microprocessor 26 by electrical line 34. As intended by the present invention, the microprocessor 26 receives signals from the sensors 22, 24 representing the angular positions of the gears 12, 14. Using these signals, the microprocessor 26 determines the absolute position of the rotating shaft 16, as described below.

In a preferred embodiment, the gear ratio of the input gear 12 to the output gear 14 is chosen such that the output gear 14 rotates with a higher angular velocity than the input gear 12. More specifically, the gear ratio between the input gear 12 and the output gear 14 is chosen so that the gear ratio is not a whole number, e.g., the gear ratio is five and two-tenths to one (5.2:1) for measuring five turns of a steering wheel. Since the gear ratio is not a whole number, the gears 12, 14 are out of phase with each other as they rotate. For example, with a gear ratio of five and two-tenths to one (5.2:1), after the input gear 12 rotates three hundred and sixty degrees (360°), the output gear 14 rotates one thousand, eight hundred and seventy-two degrees (1872°). Thus, the output gear 14 is out of phase with the input gear 12 by seventy-two degrees (72°) and with each additional revolution of the input gear 12, the output gear 14 will be out of phase with the input gear 12 by an additional seventy two degrees (72°). Once the shaft 16 completes five revolutions, the input gear 12 and the output gear 14 are again in phase.

Thus, the absolute angular position of the input gear 12 may be determined, e.g., for a range of zero to eighteen hundred degrees (0–1800°) or five complete turns (N=5) of a vehicle steering wheel when the gear ratio is 5.2:1. It is to be appreciated the present principles can be applied to measure more, or less, than five turns (N>5 or N<5) by appropriately establishing a non-integer gear ratio the whole number portion of which is greater than the maximum number of turns it is desired to measure.

The present invention has determined that for a gear ratio of 5.2:1, the error tolerance of the signal representing the angular position of the input gear 12 output by the input gear sensor 22 is plus or minus six and nine-tenths degrees (+/−6.9°). As such, if the difference between the angular position of the input gear 12 and the angular position of the output gear 14 divided by the gear ratio is greater than 6.9°, the microprocessor 26 will compute the wrong phase and, in turn, compute an incorrect value for the absolute angular position of the rotating shaft 16. In order to prevent the microprocessor 26 from determining an incorrect value for the absolute angular position of the rotating shaft 16, it is necessary to compensate, or adjust, the value of the angular position of the input gear 12 represented by the signal from the input gear sensor 12.

Figure 2:
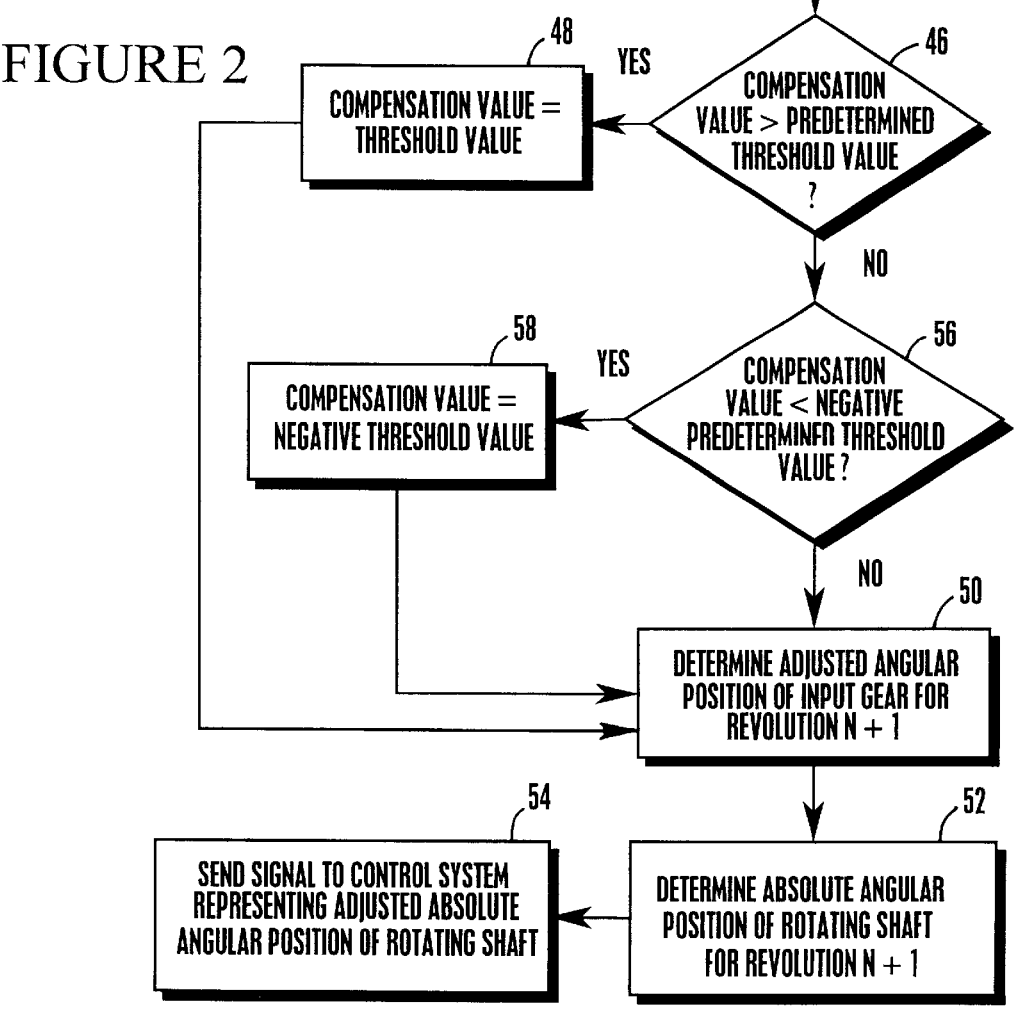
FIG. 2 is a flow chart of a method for compensating signals from the absolute angular position sensor assembly.

Referring to FIG. 2, a block diagram representing a method for compensating signals from the absolute angular position sensor assembly is shown. Commencing at block 40, a signal is received from the output gear sensor 24 that represents the high resolution angular position of the rotating shaft for revolution N. Thereafter, at block 42, a signal is received from the input gear sensor 22 that represents the angular position of the input gear 12. Proceeding to block 44, an angular position compensation value is determined for revolution N+1, i.e., the next revolution of the input gear 12. The angular position compensation value is determined using the formula:

$$APCV_{N+1} = (APRS_N - AAPIG_N)/\alpha + APCV_N$$

Where:
$APCV_{N+1}$=Angular position compensation value for revolution N+1;
$APRS_N$=Angular position of the rotating shaft 16 for revolution N, i.e., the previous revolution, as indicated by the signal from the input gear sensor 22;
$AAPIG_N$=Adjusted angular position of the input gear 12 for revolution N, as indicated by the signal from the output gear sensor 24;
$\alpha$=Compensation factor ($\alpha > 1$); and
$APCV_N$=Angular position compensation value for revolution N.

Continuing the description of the logic, at decision diamond 46 it is determined whether, the angular position compensation value determined at block 44 is greater than a predetermined threshold value, e.g., 6.9E. If so, the logic moves to block 48 where the angular position compensation value is set equal to the threshold value. Then, at block 50 an adjusted angular position of the input gear 12 is determined for revolution N+1 using the formula:

$$AAPIG_{N+1} = APIG_{N+1} + APCV_{N+1}$$

Where:
$AAPIG_{N+1}$=Adjusted angular position of the input gear 12 for revolution N+1;
$APIG_{N+1}$=Angular position of the input gear 12 for revolution N+1; and
$APCV_{N+1}$=Angular position compensation value for revolution N+1.

Proceeding with the description of the logic, after the adjusted angular position of the input gear 12 is determined, the absolute angular position of the rotating shaft 16 is determined for revolution N+1 at block 52. Then, at block 54, a signal representing the absolute angular position of the rotating shaft 16 is sent from the microprocessor 26 to the control system 32.

Returning to decision diamond 46, if the angular position compensation value is less than the predetermined threshold, the logic moves to decision diamond 56 where it is determined if the angular position compensation value is less than the negative of the predetermined threshold value. If so, the logic continues to block 56 where the angular position compensation value is set equal to the negative of the predetermined threshold value. Thereafter, the logic moves to block 50 and continues as described above. If, at decision diamond 56, the compensation angle is greater than the negative of the predetermined threshold value, then the logic continues to block 50 and then, proceeds as described above.

With the configuration of structure described above, it is to be appreciated that the method for compensating signals from an absolute angular position sensor assembly provides a means for accounting for errors in signals from input gear sensor 22. Thus, the accuracy of the value determined for the absolute position of the rotating shaft is increased.

While the particular METHOD FOR COMPENSATING SIGNALS FROM AN ABSOLUTE ANGULAR POSITION SENSOR ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for determining an absolute position of a rotating shaft, comprising the acts of:
    determining an angular position compensation value for an $N^{th}+1$ shaft revolution at least in part by determining a difference between an angular position of the rotating shaft for an $N^{th}$ revolution and an adjusted angular position of an input gear coupled to the shaft for the $N^{th}$ revolution, and adding to the difference an angular position compensation value for the $N^{th}$ revolution; and
    determining the absolute angular position of the rotating shaft at least partially based on the angular position compensation value.

2. The method of claim 1, further comprising the act of:
    dividing the difference by a compensation factor that is greater than one.

3. The method of claim 1, further comprising the act of:
    determining if the angular position compensation value is greater than a predetermined maximum threshold; and
    if so, setting the angular position compensation value equal to the predetermined maximum threshold.

4. The method of claim 1, further comprising the act of:
    determining if the angular position compensation value is less than a predetermined minimum threshold; and
    if so, setting the angular position compensation value equal to the predetermined minimum threshold.

5. A vehicle control system comprising:
    an absolute angular position sensor assembly; and
    a microprocessor connected to the sensor assembly, the microprocessor including a program for adjusting a signal representative of an absolute angular position of a rotating shaft using an angular position compensation value, the angular position compensation value for an $N^{th}+1$ shaft revolution being determined at least in part by determining a difference between an angular position of the rotating shaft for an $N^{th}$ revolution and an adjusted angular position of an input gear coupled to the shaft for the $N^{th}$ revolution, and adding to the difference an angular position compensation value for the $N^{th}$ revolution.

6. The system of claim 5, wherein the program further comprises:
    logic means for determining whether the angular position compensation value is greater than a predetermined maximum threshold; and
    logic means for setting the angular position compensation value to be equal to the predetermined maximum threshold, if so.

7. The system of claim 5, wherein the program further comprises:
    logic means for determining whether the angular position compensation value is less than a predetermined minimum threshold; and
    logic means for setting the angular position compensation value to be equal to the predetermined minimum threshold, if so.

* * * * *